June 5, 1934.  L. F. NENNINGER  1,961,523
MILLING MACHINE
Filed April 26, 1930  2 Sheets-Sheet 1
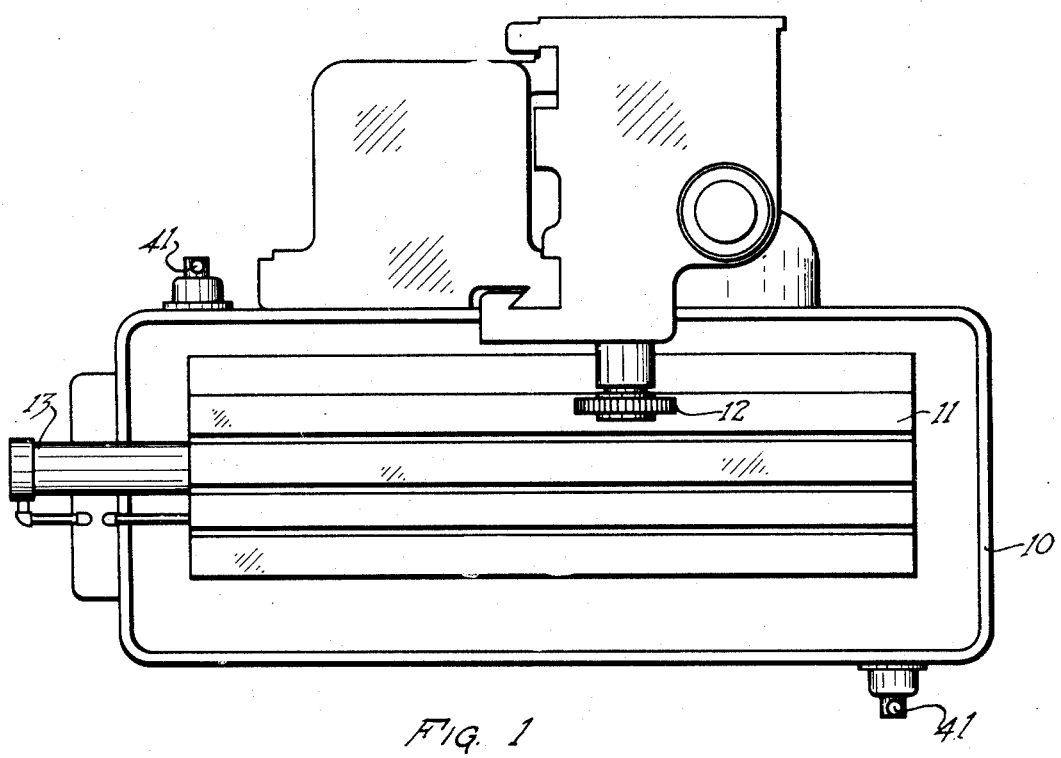
FIG. 1
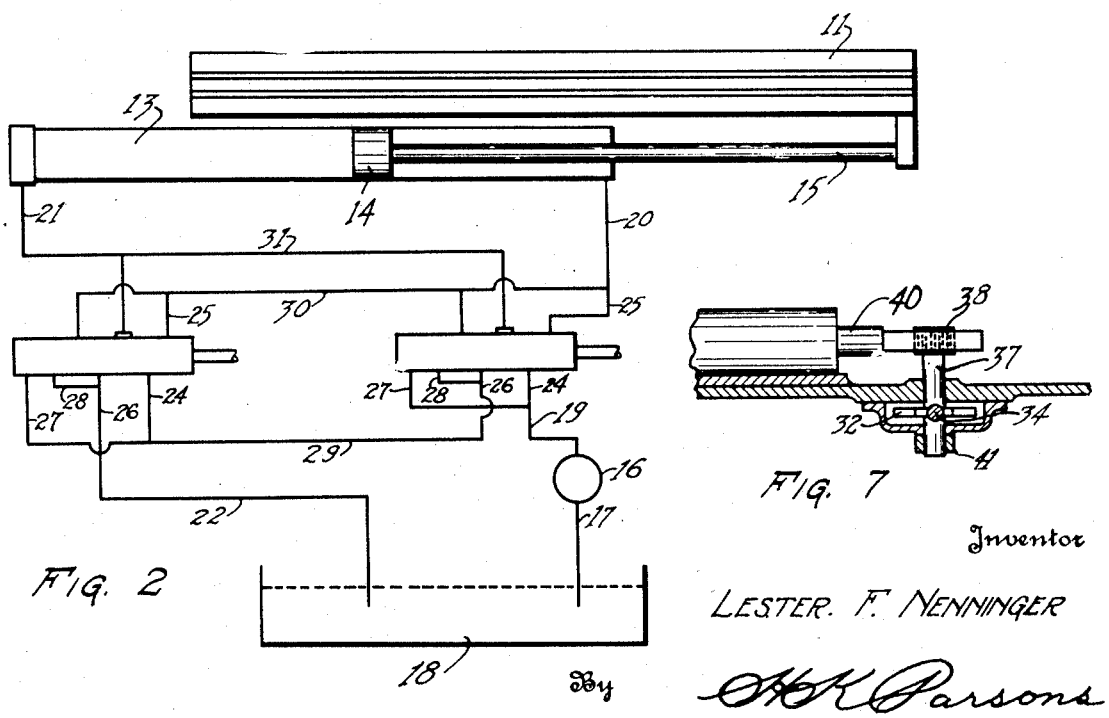
FIG. 2
FIG. 7
Inventor
LESTER F. NENNINGER
By AK Parsons
Attorney June 5, 1934.　　　　L. F. NENNINGER　　　1,961,523
MILLING MACHINE
Filed April 26, 1930　　2 Sheets-Sheet 2

Inventor
LESTER F. NENNINGER
By AHK Parsons
Attorney

/ Patented June 5, 1934

1,961,523

UNITED STATES PATENT OFFICE 1,961,523

MILLING MACHINE

Lester F. Nenninger, Cincinnati, Ohio, assignor to The Cincinnati Milling Machine Company, Cincinnati, Ohio, a corporation of Ohio Application April 26, 1930, Serial No. 447,707

13 Claims. (Cl. 90—21.5)

This invention relates to hydraulically operated machine tools and more particularly to improvements in control means therefor.

An object of this invention is the provision of an hydraulically actuated machine tool such as a milling machine that may be controlled from a plurality of operating stations about the machine.

Another object of this invention is the provision of a milling machine having an hydraulically actuated work support and means for controlling the hydraulic actuation thereof from either the operator's normal position at the front of the machine on one side of the support or from a position on the opposite side thereof.

A further object of this invention is the provision of dual hydraulic control mechanism for an hydraulically operated machine tool whereby either one may be operated when the other is in neutral position and mechanism whereby each will be maintained in neutral position except when actually being utilized.

Other objects and advantages of the present invention should be readily apparent by reference to the following specification considered in conjunction with the accompanying drawings illustrative of one embodiment thereof but it will be understood that any modifications may be made in the specific structural details hereinafter disclosed within the scope of the appended claims without departing from or exceeding the spirit of the invention.

Referring to the drawings in which like reference numerals indicate like parts:

Figure 1 is a plan view of a milling machine embodying this invention.

Figure 2 is a diagrammatic view of the hydraulic circuit.

Figure 7 is a sectional view of the valve operating mechanism.

Figure 3:
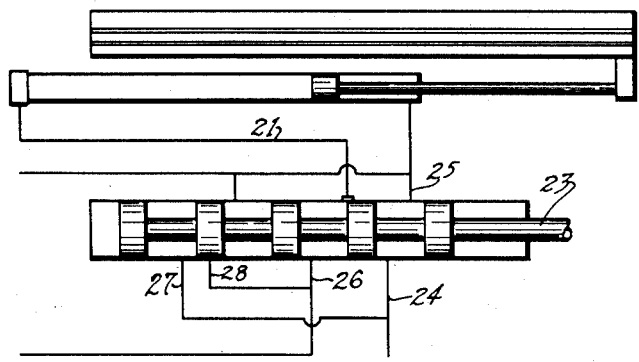
Figures 3, 4 and 5 are views showing a control valve in its various positions of adjustment.

In the drawings the reference numeral 10 indicates generally a support of a machine tool such as a milling machine having a work table 11 mounted thereon for cooperation with a cutting element 12 also carried by the support. The work table is adapted to be reciprocated by hydraulic means such as the cylinder 13 having the piston 14 working therein, and operatably connected to the work table as by the piston rod 15.

In order to supply fluid pressure to the cylinder for actuation of the piston, a pump such as 16 may be provided having a connection 17 with a reservoir 18 and a pressure channel 19 for supplying fluid pressure to either end of the cylinder through channels 20 or 21 respectively. A channel 22 is provided for connection with either of the channels 20 or 21 for conducting the returning fluid to the reservoir.

Figure 4:
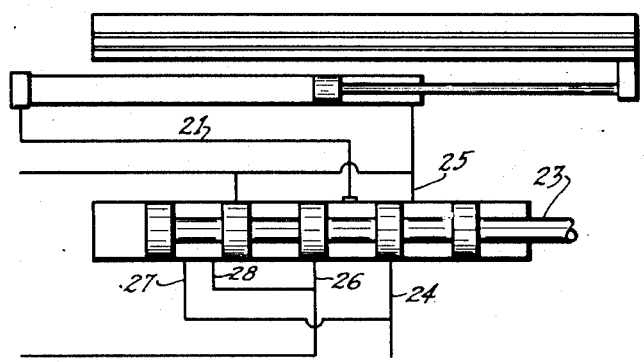
Figure 5:
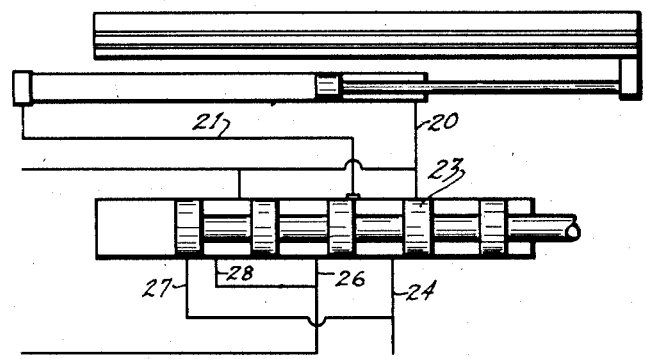
Figure 6:
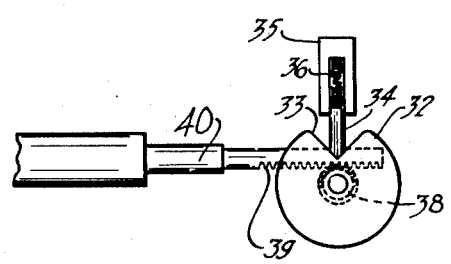
Figure 6 is a diagrammatic view of the valve neutralizing means.

The movements of the piston and the work table connected therewith are controlled by a plurality of control valves interposed in parallel relation between the channels 19, 22 and the channels 20, 21. Since each of these valves are of the same construction it is thought that a description of one will suffice for the present purpose. Referring to Figures 3, 4 and 5 the valve member 23 is shown having a plurality of spools for effecting desired connections to cause movement of the piston in either a forward or reverse direction, the valve also having a neutral position for stopping the table. In these figures, the channel 24 is connected to a source of pressure such as the pump 16 and when the valve is in the position shown in Figure 3 it is adapted to be connected by the channel 25 with the forward end of the cylinder and when the valve is in the position shown in Figure 5 adapted to be connected with the opposite end of the cylinder; while Figure 4 shows the valve in neutral position with the pressure line disconnected from either end of the cylinder. Simultaneously with these movements the exhaust or return channel 26, as shown in Figures 3 and 5 may be connected with either the line 21 or the line 25 to permit fluid from the low pressure side of the cylinder to return to the reservoir.

Attention is invited to the fact that when the valve is in neutral position, as shown in Figure 4, the channels 21 and 25 are closed by the valve retaining the fluid on opposite sides of the pistons thereby preventing accidental movement of the table. At the same time the pressure line 24 is short circuited with the return line 26 by means of the channels 27 and 28 thus preventing excessive pressure building up in the pump with the possibility of breakage of some of the parts.

In order to connect the valves for selective operation, the return line 26 from one valve is connected by the channel 29 with the pressure line of the other valve. Also the line 20 from one end of the cylinder is connected in parallel with the two valves by the channel 30 while the line 21 from the opposite end is connected in parallel with the two valves by the line 31. By referring to Figure 2 it should be apparent that when either valve is in neutral position it is possible to operate the other one to control the movements of the table. To insure that the valves will be in neutral position except when being utilized, detent means have been provided which may take the form of a circular disk 32 having a V shaped indent 33 in its periphery which is engaged by the spring pressed detent plunger 34. The plunger may be reciprocably mounted in a cylinder or housing such as 35 having a closed end and a spring 36 interposed between the closed end and the plunger to maintain the latter in contact with the detent. The disk 32 is keyed to a shaft 37 which may be journaled in the bed of the machine as shown in Figure 7 having a pinion 38 for operative engagement with a rack portion 39 formed on the end of the valve operating rod 40. A handle 41 is keyed to the projecting end of the shaft 37 for manual operation of the valve. From the construction it is apparent that after the valve has been moved to one of its operative positions by the operator grasping the handle 41 that the valve will automatically return to its neutral position when operator releases the handle. This insures that either valve will be in neutral position when the other one is being operated.

As shown in Figure 1, a valve has been placed on opposite sides on the work table, making it possible for the operator to control the movements of the table from the front of the machine, or if it is desirable to observe the action of the cutter from the rear of the table, it may still be controlled from that position also. Thus a simplified control has been provided for an hydraulically actuated machine tool and although a simple circuit has been chosen for illustrative purposes, the invention is equally adaptable to other known types of circuits.

Attention is invited to the fact that when the handles 41 are in perpendicular position, as shown in Figure 1, that the valves are in neutral position, and the connection between the pinion 38 and the rack 39 is such in each case that either handle is movable therefrom in the direction that it is desired to have the table move, to make the necessary valve connections to cause movement of the table in that direction.

That which is claimed is:

1. A milling machine having a bed, a spindle carried thereby, a work support translatably mounted upon the bed for relative movement thereto, hydraulic means for translating the support including a cylinder and piston, a source of pressure, means to control the admission of pressure to either end of the cylinder to effect translation of the support in a determined direction including dual control slide valves connected between the source of pressure and said cylinder, each of said valves having a neutral position and an hydraulic pressure coupling position on each side thereof.

2. A milling machine having a bed, a spindle carried thereby, a work support translatably mounted on the bed for movement with respect to the spindle, an hydraulic motor for translating said table, a source of pressure, means to connect the motor with said pressure including dual control valves and adapted for independent operation, each of said valves having an inoperative position and an operative position on each side thereof and means to operate either of said valves to control the admission of pressure to the motor when the other valve is in an inoperative position.

3. A milling machine having a support, a table reciprocably mounted therein, a source of hydraulic pressure for effecting movement of the table in either direction, dual control valves serially connected to said pressure and mounted on opposite sides of said table for alternatively determining movement of the table, and individual directional control handles for each valve whereby the table will move in the direction in which the handle is moved.

4. A machine tool having a reciprocable support, hydraulic means for reciprocating said support, a plurality of individually operated valves for determining the effect of said means, each valve having a neutral position and an operative position on each side thereof, and means in each valve to render the remaining valve ineffective when said valve is in either of its operative positions.

5. A milling machine having a support, a work table slidable thereon, a cutter spindle carried by the support, hydraulic means for effecting movement of said table relative to the spindle, dual control valves for said hydraulic means, each valve having a neutral position and a power transmitting position on either side thereof, means to supply pressure to one of said valves and means in the first valve to couple the pressure to the second valve when the first valve is in a neutral position.

6. A milling machine having a support, a work table slidable thereon, a cutter spindle carried thereby, hydraulically actuated means for effecting movement of the table relative to the spindle, a source of pressure, dual control valves for determining the coupling of pressure to the table, a return line, and means in a first valve to connect the second valve to the return line when said first valve is in a neutral position.

7. A milling machine having a support, a work table mounted thereon, a cutter spindle carried thereby, hydraulically actuated means for effecting movement of one with respect to the other to perform a tooling operation, a source of pressure dual control valves for said hydraulically actuated means, said valves being located at spaced control stations and each having a neutral position and a power transmitting position on either side thereof, means to supply pressure to a first valve, means in the first valve to couple the pressure to the second valve, and means to disconnect pressure from the second valve upon movement of the first valve to either of its power transmitting positions.

8. A milling machine having a support, a work table mounted thereon, a tool spindle carried thereby, hydraulically actuated means for effecting relative movement between the table and tool spindle to perform a tooling operation, a plurality of control valves for said hydraulically actuated means located at different operating stations, each valve having a neutral position and an hydraulic pressure coupling position on either side thereof, a source of hydraulic pressure, means to conduct the hydraulic medium to said valves, means in each valve to short circuit the medium to exhaust when the valve is in a neutral position, and means to disconnect the pump from the exhaust upon movement of any valve to a pressure coupling position.

9. A milling machine having a support, a work table translatable on said support, a tool spindle carried by the support at one side of said work table, hydraulically actuated means for effecting relative movement between the table and tool spindle including a piston and cylinder, dual control valves located at opposite sides of the work support, means to connect the valves in parallel to said cylinder, a source of pressure, means to connect the valves in series with said source of pressure, and additional means to connect the valves in series with exhaust whereby either valve may control the operation of the table.

10. A milling machine having a bed, a tool spindle carried thereby, a work support mounted thereon for relative movement with respect to the spindle, hydraulically actuated means for shifting the support, means for controlling actuation of the support including dual control valves, each valve having a neutral position and an hydraulic coupling position on either side thereof, means to supply pressure to said valves in series, means to couple the valves in parallel with said cylinder, manual control means for each valve including directional control lever whereby movement of the lever from a neutral position will indicate the direction of movement of the work support and automatic means for returning the lever to a neutral position upon release thereof by the operator.

11. A milling machine having a support, a work table translatable on said support, a tool spindle carried by the support, hydraulically actuated means for effecting translation of the table including a piston and cylinder, a source of pressure, dual control valves located at spaced operating positions for determining table movement, a reservoir, means to couple the valves in series with said source of pressure and in series with said reservoir, said means including a single channel extending from one valve to the other, said channel serving as an exhaust channel during operation of one of said valves and as a pressure channel during operation of the other valve.

12. An hydraulic transmission and control mechanism for the slidable support of a machine tool comprising an hydraulic motor for actuating the support, a plurality of valve members arrived in series, a first channel means extending from the motor to each valve member, a second channel means extending from the motor to each valve member, a third channel for supplying pressure to the first and second motor channels to effect movement of the support, means in the first of said valves for selectively coupling the third channel to the first or second channel to determine the direction of support movement, a fluid reservoir, a pump for withdrawing fluid from said reservoir and maintaining the third channel under pressure, a fourth channel extending from the last of said plurality of valve members to said reservoir, a fifth channel extending between valves, means in the last valve for coupling the fifth channel to the fourth channel, and means in the first valve upon coupling of pressure thereby to one motor channel to connect the other motor channel to the fifth chanel and thereby to reservoir said first valve having a neutral position for coupling the third channel to the fifth channel and thereby supplying pressure to the next valve in the series, and means to shift said next valve to effect alternate coupling of pressure to the motor channels to control support movement whereby the support may be controlled from a plurality of stations.

13. An hydraulic transmission and control mechanism for the slidable support of a machine tool comprising an hydraulic motor for actuating the support, a plurality of valve members arrived in series, a first channel means extending from the motor to each valve member, a second channel means extending from the motor to each valve member, a third channel for supplying pressure to the first and second motor channels to effect movement of the support, means in the first of said valves for selectively coupling the third channel to the first or second channel to determine the direction of support movement, a fluid reservoir, a pump for withdrawing fluid from said reservoir and maintaining the third channel under pressure, a fourth channel extending from the last of said plurality of valve members to said reservoir, a fifth channel extending between valves, means in the last valve for coupling the fifth channel to the fourth channel, and means in the first valve upon coupling of pressure thereby to one motor channel to connect the other motor channel to the fifth channel and thereby to reservoir said first valve having a neutral position for coupling the third channel to the fifth channel and thereby supplying pressure to the next valve in the series, and means to shift said next valve to selectively couple the fifth channel to one motor channel and the remaining motor channel to the fourth channel and thereby to reservoir to effect movement of the support in a desired direction whereby the support member may be selectively controlled from a plurality of stations, manual means for shifting each valve and individual means associated with each valve for normally maintaining each valve in a neutral position.

LESTER F. NENNINGER.